United States Patent Office 3,658,791
Patented Apr. 25, 1972

3,658,791
PHOSPHORUS-CONTAINING COMPOUNDS
Giuliana C. Tesoro, Dobbs Ferry, N.Y., and Wing-Kai Lee, Hackensack, and Kelvin B. Domovs, Newark, N.J., assignors to J. P. Stevens & Co., Inc., New York, N.Y.
No Drawing. Continuation-in-part of application Ser. No. 490,658, Sept. 27, 1965. This application Oct. 17, 1967, Ser. No. 675,790
Claims priority, application Great Britain, Feb. 21, 1967, 8,146/67
Int. Cl. C07f 9/38, 9/56
U.S. Cl. 260—239 EP           10 Claims

ABSTRACT OF THE DISCLOSURE

This invention describes novel water-soluble nitrogen-containing phosphonates and the methods for their preparation. The phosphonates are prepared by reacting halogenated phosphonates with nitrogen compounds whereby some of the halogen atoms are replaced with nitrogen-containing groups. The halogenated phosphonates may also be modified by reaction with trialkyl phosphites before subsequent reaction with appropriate nitrogen-containing compounds.

---

This application is a continuation-in-part of an application bearing Ser. No. 490,658, filed Sept. 27, 1965, and now abandoned, entitled "Novel Phosphorus-Containing Compounds."

This invention relates to novel phosphorus-containing compounds and more particularly, it relates to the preparation of novel, water-soluble nitrogen-containing phosphonates.

In accordance with this invention, nitrogen-containing phosphonates are prepared, said phosphonates being represented by generic Formulae A and B:

(A) 

(B) 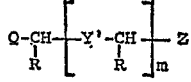

wherein (a) R is selected from the group consisting of hydrogen and lower alkyl having from 1 to 4 carbon atoms;

(b) Q is a grouping, being one selected from the formulae consisting of

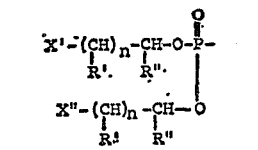

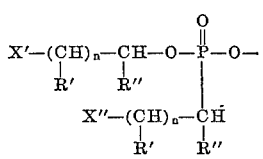

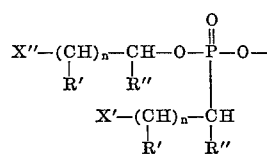

where
$n$ has a value of 0 to 2;

R' and R'' are selected from the group consisting of hydrogen, lower alkyl, halogen, and lower haloalkyl;

X' is a grouping of the formula

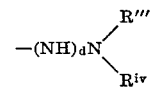

where $d$, R''', and R$^{iv}$ are as defined below;

X'' is selected from the group consisting of halogen,

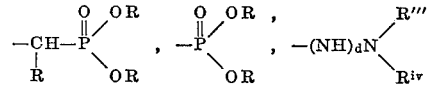

where $d$ has a value of 0 to 1;

R''' and R$^{iv}$ are selected from the group consisting of hydrogen, alkyl, hydroxyalkyl, alkoxyalkyl, poly(alkyleneamino)alkyl, poly(alkyleneoxy)alkyl, aminoalkyl, alkanoyl, alkoxycarbonyl 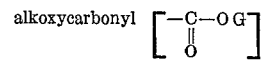

(hydroxyalkoxy)carbonyl 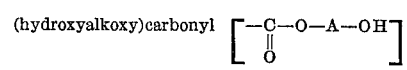

A is an alkylene group (divalent, saturated and aliphatic)

carbamoyl 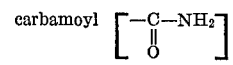

(hydroxymethyl)carbamoyl 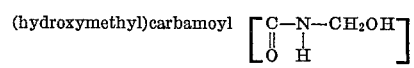

bis(hydroxymethyl)carbamoyl 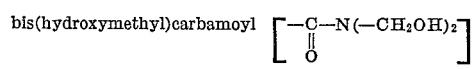

alkylcarbamoyl 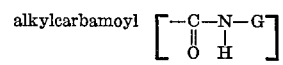

alkyl(hydroxymethyl)carbamoyl 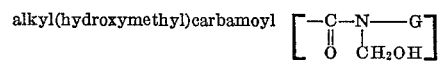

wherein G is a saturated alkyl group having 1–5 carbon atoms amidino 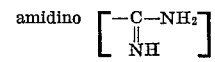

(hydroxymethyl)amidino 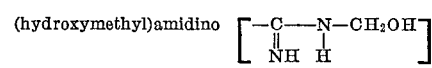

bis(hydroxymethyl)amidino 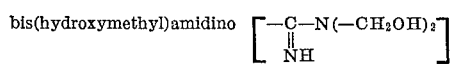

phosphinylidyne 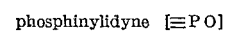

and (R'''+R$^{iv}$) can form a heterocyclic ring of which the nitrogen atom is also a member, (c) Y is selected from the group consisting of X' and

where R and X' are as defined above;

(d) Y' is a group of the formula

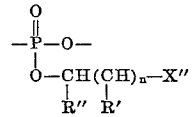

where $n$, R', R''' and X'' are as defined above;

(e) *m* has a value of 0 to 3;

(f) Z is selected from the group consisting of the radical O as defined above, the radical Y as defined above, a grouping of the formula

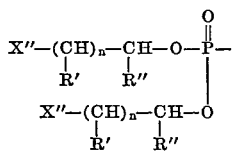

and a grouping of the formula

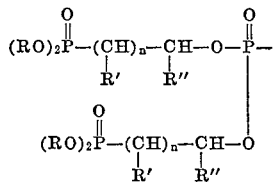

where *n*, R, R', R'', and X'' are as defined above.

The aforedescribed phosphonates can be used in formulations for treatment of polymeric materials, including films and textile fibers, in order to impart thereto such useful properties as durable flame retardation and enhanced dyeability. A particularly desirable property of many of these phosphonates is their solubility in aqueous media.

The phosphonates of this invention may be prepared by reacting halogenated phosphonates with nitrogenous compounds such as ammonia, primary amines, secondary amines, hydrazine, urea, and guanidine, thereby replacing at least some of the halogen atoms with amino, substituted amino, hydrazino H$_2$NNH—, ureido

H$_2$NCONH— and guanidino H$_2$NC(=NH)NH— groupings.

The substituted ureas, hydroxyalkyl carbamates, other carbamates, and other amides (such as result respectively from reaction of isocyanates, cyclic carbonates, esters of chloroformic acid, and acyl chlorides on amino phosphonates) can be converted to reactive N-(hydroxymethyl) derivatives, also soluble in aqueous media, by treatment with formaldehyde, paraformaldehyde, or other formaldehyde precursor.

Representative of the halogenated phosphonates which are useful starting materials for the preparation of nitrogenated phosphonates of this invention are the following compounds:

Formula (1)
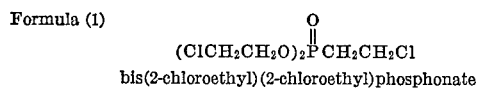
bis(2-chloroethyl) (2-chloroethyl)phosphonate

Formula (2)
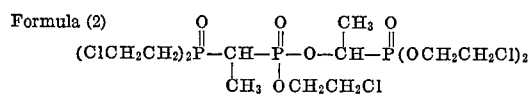

Formula (3)
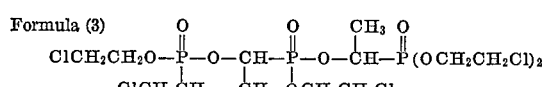

Formula (4)
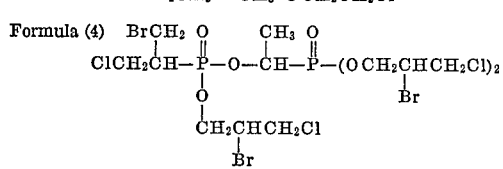

The halogenated phosphonate starting material may first, if desired, be modified by reaction with trialkyl phosphites before subsequent reaction with appropriate nitrogen-containing compounds. Such preliminary phosphonation yields halophosphonates which, because of their higher phosphorus content, possess enhanced flame retardation characteristics. Thus, for example, bis(2-chloroethyl)(2-chloroethyl)phosphonate may be reacted with a trialkyl phosphite according to the following equation:

Equation (1)

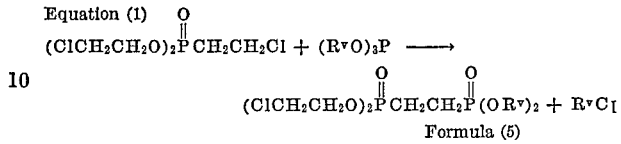

Formula (5)

In the equation given above, R' represents a substituted or unsubstituted aliphatic radical, including branched or straight-chain alkyl, haloalkyl, or alkenyl.

The nitrogen compounds which can be reacted with the halogenated phosphonates to obtain water-soluble reactive nitrogen-containing phosphonates include ammonia, aliphatic primary amines, substituted and unsubstituted hydrazines, alkylenediamines such as ethylenediamine; hydroxyalkyl-alkylenediamines, such as 2-(2-aminoethylamino)-ethanol; hydroxyalkylamines such as 2 - aminoethanol; cyclic amines such as morpholine and pyrrolidine; cyclic diamines such as piperazine; alkyleneimines such as ethylenimine and 2-methylaziridine; amides such as urea; and amidines such as guanidine. The resulting substituted ureas and guanidines can be methylolated by means of formaldehyde to form additional valuable water-soluble reactive amido and amidino phosphonates.

Useful products can be obtained by employing any one of a large number of amino compounds, and the examples listed previously are merely illustrative of the nitrogenous compounds which can be used to prepare the novel nitrogen-containing phosphonates.

Preferred products are obtained by reacting the halogenated phosphonates with ammonia; with hydrazine; with alkylenediamines having the formula NH$_2$C$_a$H$_{2a}$NH$_2$ where *a* has a value of from 2 to 6; and with alkylenimines having the formula

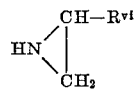

where R$^{vi}$ is hydrogen or lower alkyl having from 1 to 4 carbon atoms. In these preferred products, the amino groups introduced are highly reactive, and are therefore capable of entering into polymerization and crosslinking reactions with suitably selected co-reactants. Furthermore, the equivalent weight of the nitrogen-containing radical is low, and the proportionate phosphorus content of the product accordingly high. This is desirable in compounds designed to impart flame-retardant properties, since the effectiveness of the compounds employed as flame retardants is generally proportional to their phosphorus content.

Preferred products also are obtained by reacting halogenated phosphonates with alkylamines such as methylamine, dodecylamine, and octadecylamine, with secondary amines such as 2,2'-iminodiethanol, with amidines such as guanidino H$_2$NC(=NH)NH— and by ureido H$_2$NCONH— groups, respectively.

The conversion of the halogenated phosphonates to the corresponding nitrogen-containing phosphonates in accordance with this invention is surprisingly achieved without significant aminolysis of the ester groups, and the reaction can be represented schematically by the following equations (2) and (3) wherein a simple chloroethyl phosphonate, namely, bis(2-chloroethyl) 2-(chloroethyl)-phosphonate is used as an example of a suitable starting material.

Equation (2)
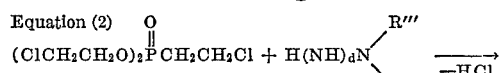
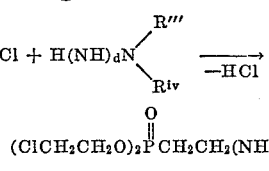

(Equation 3)
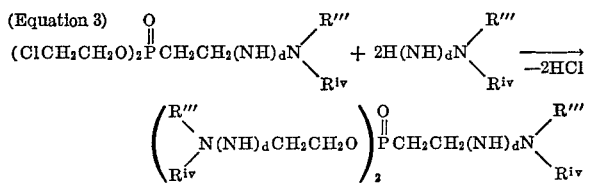

Employing the procedure of this invention, partial replacement of the halogen atoms is possible, with the number of amino groups introduced being dependent upon the reaction conditions, including the ratio of amine to halogen compound used, the time and temperature of the reaction, the concentration of reactants and the solvent. In addition, different nitrogen compounds can simultaneously be employed in the steps represented by Equations 2 and 3, yielding products containing different nitrogenous residues in the same molecule. When it is desirable to replace every halogen with an amino group, a rapid reaction rate is preferred, whereas a slower rate is preferred for partial replacement of the halogen groups. The ratio of amino compound can be varied from about 0.2 mole to about 5 moles per halogen atom present in the starting material, with the preferred ratio ranging from 0.5 to 2. Although the solvent used is not critical, alcohols, glycols and glycol ethers are generally preferred since they are particularly effective solvents for the starting materials. Ethylene glycol is a particularly desirable solvent and appears to have an accelerating effect on the desired reaction. Water can also be used, but care must be exercised in avoiding hydrolysis of the haloalkyl groups present by using carefully controlled conditions of temperature and pH, avoiding a temperature higher than about 80° C. and a pH lower than about 6.0. In carrying out the reaction in organic solvents, temperatures of 50° C. to 150° C. are preferred, but temperatures outside this range can also be employed. At temperatures below 50° C. reaction takes place very slowly, but nevertheless at an appreciable rate with some amino compounds. At temperatures of from 150° C. to about 200° C., reaction proceeds rapidly at atmospheric or superatmospheric pressure, depending upon the boiling point of the reactants. However, reaction at temperatures greater than 150° C. is usually accompanied by discoloration of the reaction mixture.

Generally, the extent of reaction at any given time can be determined by withdrawing a representative sample of the reaction mixture, and titrating the ionic halide present argentometrically. The percentage of the total halide present in ionic form is a measure of the extent of reaction. The extent of reaction can also be assessed by testing the water solubility of the reaction mixture, since the conversion of halophosphonate to nitrogen-containing phosphonate is accompanied by an increase in water solubility. When the desired extent of reaction has been reached, the product can be isolated by any of several methods. It is generally desirable to neutralize the halogen acid formed either during the reaction or upon its completion by adding an inorganic base such as alkali carbonate or bicarbonate. The alkali halide formed in this neutralization can be filtered if desired. The solvent and any residual unreacted nitrogenous compound can then be stripped by distillation at atmospheric pressure or in vacuo. Alternatively, if purification of the product is not required, water may be added to dissolve the alkali halide formed up neutralization, and the solution may be used directly. The nitrogen-containing phosphonates of this invention, in general, possess the desirable feature of water solubility and can therefore be applied in aqueous solutions.

It is also within the scope of this invention to prepare the nitrogen-containing phosphonates described hereinabove by reacting a phosphonate represented by generic Formulae C and D (C)
$$Q'-\underset{R}{CH}-Y''$$

(D)
$$Q'-\underset{R}{CH}-\left[Y'-\underset{R}{CH}\right]_m-Z'$$

wherein (a) Q' is a grouping, being one selected from the formulae consisting of

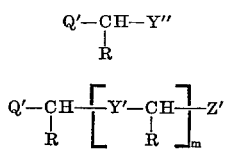

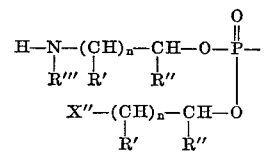

and

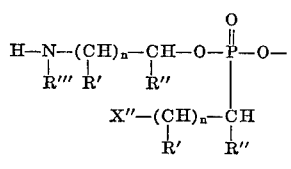

(b) Y" is selected from the group consisting of

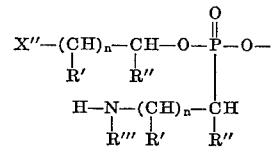

(c) Z' is one selected from the group consisting of Y", Q'

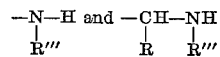

and

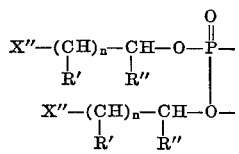

(d) R, R', R", R'", X", m, and n are as defined hereinabove.

with one compound selected from the group consisting of phosphorus oxychloride, an alkyl isocyanate, a cyclic carbonate, chloroformic acid esters and acyl chlorides.

The phosphoramidation of an amino phosphonate is graphically represented as follows:

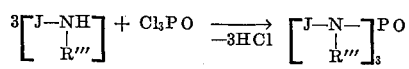

wherein J represents one valance of the non-nitrogenous moiety of a phosphonate represented by either C or D. R'" is as defined hereinabove. It will be observed that ≡PO replaces H at the amino sites on the phosphonates. These compounds are classified as phorphoramide-polyphonates.

This reaction is illustrated in Equation 4 where an amine reaction product obtained by replacing the halogens of bis(2 - chloroethyl) (2 - chloroethyl)phosphonate with ethylenediamine.

Equation (4)
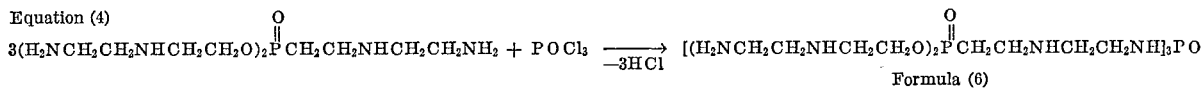
Formula (6)

It is apparent from the example shown in Equation 4, that the ratio of polyamine to $POCl_3$ can be varied, to form products of varying molecular weight and containing varying ratios of phosphonate to phosphoramide groupings in the same molecule. By the use of this reaction, starting with the phosphorus-containing polyamines of the present invention, further new products can be obtained and the physicochemical properties can be further varied.

The reaction of phosphorus-containing amines having the structure of C or D with an alkyl isocyanate,

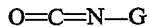

is illustrated as follows:

Equation (5)
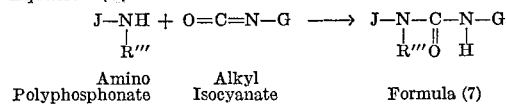
Amino    Alkyl
Polyphosphonate    Isocyanate    Formula (7)

Formula 7 denotes derivatives in which alkylcarbamoyl,

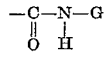

replaces H at amino sites of amino polyphosphonates. The resulting substituted ureas are substituted ureido polyphosphonates.

The reaction of phosphorus-containing amines represented by C or D with a cyclic carbonate is illustrated by the following reaction with ethylene carbonate.

Equation (6)
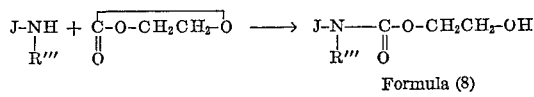
Formula (8)

Formula 8 denotes a derivative having a (hydroxyalkoxy)carbonyl grouping

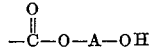

replacing H at amino sites of the amino polyphosphonate. The resulting hydroxyalkyl carbamate is a (hydroxyalkoxy)formamido polyphosphonate.

The reaction of phosphorus-containing amines represented by C or D with esters of chloroformic acid is illustrated by Equation 7, wherein G, J, and R''' are as previously defined.

Equation (7)
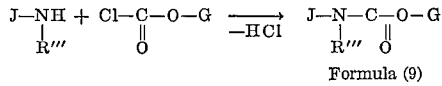
Formula (9)

Formula 9 represents derivatives in which alkoxycarbonyl,

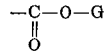

replaces H at amino sites of amino polyphosphonates. The resulting alkyl carbamates are alkoxyformamido polyphosphonates.

The reaction of phosphorus-containing amines represented by generic Formula C or D with acyl chlorides is illustrated in Equation 8 using an alkanoyl chloride,

G and R''' being as previously defined.

Equation (8)
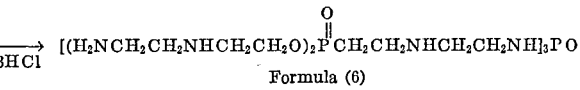
Formula (10)

Formula 10 represents derivatives in which alkanoyl,

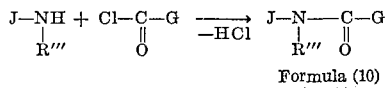

replaces H at amino sites of amino polyphosphonates. The resulting amides are alkanamido polyphosphonates.

Attention is directed to particular case of Equations 2 and 3 above when $d$ is zero, $R^{iv}$ is H, and R''' is either amidino,

or carbamoyl,

The particular equations illustrated with bis(2-chloroethyl) 2-(chloroethyl)-phosphonate, are as follows, respectively, with guanidine. (Note that

is guanidine when $d$ is zero, $R^{iv}$ is H, and R''' is amidino.)

Equation (9)
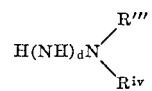

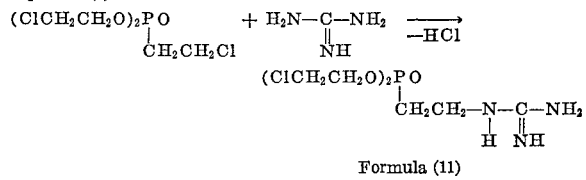
Formula (11)

Equation (10):
Formula (11) + $2H_2N-\overset{\overset{\displaystyle NH}{\|}}{C}-NH_2$ $\xrightarrow{-2HCl}$

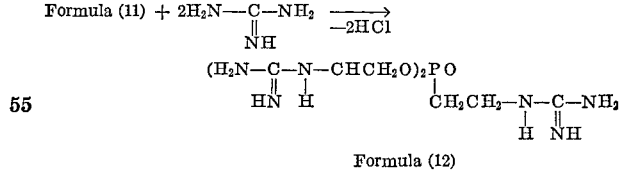
Formula (12)

The analogous particular equations using urea are as follows. (Note that

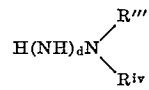

is urea when $d$ is zero, $R^{iv}$ is H, and R''' is carbamoyl,)

Equation (11)
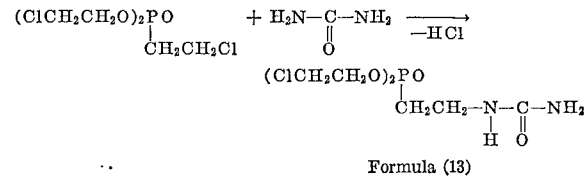
Formula (13)

Equation (12)

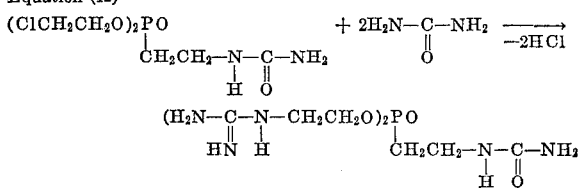

Formula (14)

Accordingly, by means of the types of reactions illustrated by Equations 9 and 10, halogenated phosphonates can be converted to guanidino phosphonates. Likewise, referring to Equations 11 and 12, halogenated phosphonates can be converted to ureido phosphonates. Partial replacement of the halogen atoms by guanidino or ureido is possible as was noted in connection with amino groups, the principles being similar to those explained following Equation 3.

As had been noted in the discussion of nitrogen compounds operable as reactants to obtain water-soluble phosphonates [after Equation 1], substituted guanidines and ureas made by means of halogenated phosphonates can be methylolated. For instance, several such hydroxymethyl derivatives can be formed from the ureido phosphonates represented by Formula 13. In order to simplify the following equations, $$(ClCH_2CH_2O)PO$$
$$\quad\quad\quad|$$
$$\quad\quad\quad CH_2CH_2-$$

will be represented by E.

Equation (13)

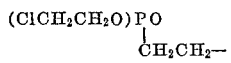

Formula (13)

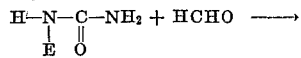

Formula (15)    Formula (16)

Equation (14)

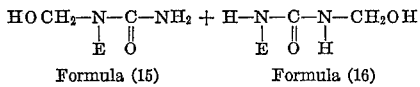

Formula (13)

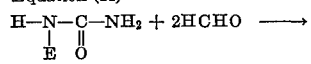

Formula (17)    Formula (18)

Equation (15)

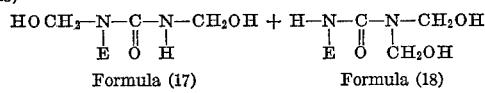

Formula (13)    Formula (19)
                Tris(hydroxymethyl) compound

Hence, several degrees of methylolation are possible, depending on the mole ratio of formaldehyde (or its precursor) to ureido phosphonate.

Other amides of this invention can be methylolated, a process which generally increases solubility in water and results in a more reactive agent for treating cellulosic films, fibrous assemblies, and textile materials. In connection with acylation reactions illustrated above by Equations 5, 6, 7, and 8, amides of this invention were formed which likewise can be modified by reaction with formaldehyde in the process called methylolation. In the following equations, G and J are as previously defined.

Equation (16)

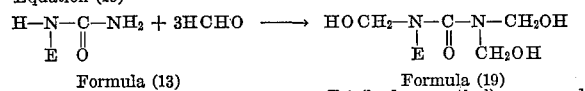

Formula (7)    Formula (20)

When R''' is H in Formulas 7 and 20, then a similar reaction can result in the formation of an isomer, Formula 21, as well:

Equation (17)

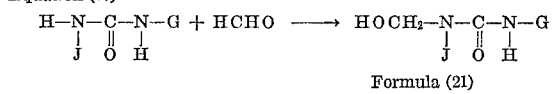

Formula (21)

Equation 18 shows the type of bis(hydroxymethyl)derivative resulting when the molar ratio of formaldehyde is doubled:

Equation (18)

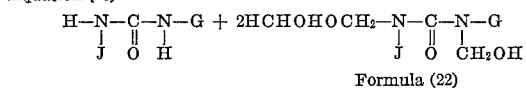

Formula (22)

Similarly, when R''' is H in Formulae 8, 9, and 10, then the following types of groupings result by methylolation:

From Formula (8):

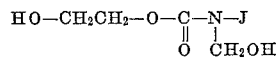

Formula (23)

From Formula (9):

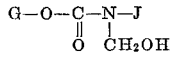

Formula (24)

From Formula (10):

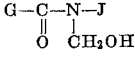

Formula (25)

The nitrogen-containing phosphonates obtained according to the processes outlined above find many useful applications, either as prepared, viz. in soluble form, or in crosslinked form resulting from reaction with poly-functional compounds. Thus, the phosphonates can be employed to impart flame-retardant properties to a variety of organic substrates. Such substrates are generally polymeric films or fibrous asemblies. Of particular interest are those substrates containing cellulose in the form of paper, cotton, regenerated cellulose, cellophane and the like. If the treated substrate is not to be exposed to washing or other wet handling, the phosphonates can be used without a co-reactant. If the treated substrate is to be wet-treated, as for example, in the case of a textile fabric, then the phosphonate can be insolubilized in situ by reaction with a co-reactant.

The phosphonates of this invention can also be used to enhance the dyeability of polymeric materials. Thus, for example, these phosphonates can be employed to modify the dyeability of hydrophobic fibers, if desired. The ability to enhance dyeability is utilized to best advantage in treating polymers which are compatible with the phosphonates, e.g., polyolefins and other hydrophobic, chemically inert polymers. The phosphonate compound is added before forming or shaping of the polymer in order to provide modified polymers of improved polarity and dyeability. Amounts of nitrogen-containing phosphonates between about 1% and about 12% based on the weight of the polymer being modified provide products having excellent dyeability. If utilized before shaping of the polymer, the nitrogen-containing phosphonates are added in solution. However, the phosphonates can be insolubilized by treating the modified polymer with poly-functional compounds after the shaping, molding, spinning, or other forming operation. Phosphonates of generic Formulae A and B wherein R''' and/or $R^{iv}$ are alkyl groups having more than 8 carbon atoms are of particular advantage in providing enhanced dyeability to polymeric materials.

In the treatment of cellulosic fabrics for either enhancing their dyeability or their flame-resistant characteristic, it is convenient to use the polymethylol derivatives in the form of the neutralized aqueous reaction solution resulting from the polymethylolation reaction. The padding of the solution mixture onto the cellulosic fabric is done so as to impregnate the fabric with 2 to 20% of the reagent, based on the weight of cellulose in the fabric. Also, between approximately 8 and 80 parts by weight of magnesium chloride, zinc tetrafluoroborate, or similar acid-generating compound should be used in the pad bath per 100 parts by weight of the polymethylolated derivative. (Mineral acid salts of ammonia and amines, or organic acids are also operable as suitable catalysts.) The padded fabric is dried at a moderate temperature, e.g., 50 to 70° C., then cured for about 3 to 6 minutes at a high temperature, preferably higher than about 100° C. Temperatures in the range of 120 to 200° C. yield excellent results, although higher temperatures may be employed.

The phosphorus-containing nitrogenated compounds obtained according to the process outlined above, illustrated in Equation 4, react readily with polyfunctional compounds to form crosslinked phosphorus-containing resins. This insolubilization reaction is generally caused by heating, and the catalysts for the insolubilization reactions are determined by the structure of the co-reactants. For example, a textile material, and particularly a textile material comprising cellulosic fibers, can be treated with an aqueous solution of a polyamino phosphonate and a suitable co-reactant, dried and heated (cured) to insolubilize the phosphorus-containing nitrogenated compounds in situ, thereby obtaining a flame-retardant finish durable to laundering and dry cleaning. Among the nitrogenated phosphonates of the present invention, those containing aziridinyl groups (obtained by reaction of haloalkyl phosphonates with alkylenimines) can be insolubilized either in vitro or in situ even without the addition of a co-reactant, yielding crosslinked polyamine resins of high phosphorus content.

Suitable co-reactants for the insolubilization of the nitrogenated phosphonates of this invention are generally those containing at least two groupings reactive toward active hydrogen atoms, and particularly toward the amino hydrogen atoms present in the nitrogenated phosphonates. Among such groupings are, for example, epoxy groupings

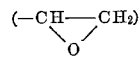

aziridinyl groupings

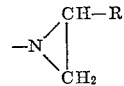

and activated vinyl groupings such as, vinylsulfonyl —SO$_2$CH=CH$_2$ (e.g., in divinyl sulfone), acrylamido —N—COCH=CH$_2$ (e.g., in 1,3,5-triacryloyl-hexahydro-s-triazine), and acryloyl —COCH=CH$_2$ (e.g., in diacryloylhexane). The preferred co-reactants include formaldehyde, tetrakis - (hydroxymethyl)phosphonium halides, polyepoxides (polyglycidyl ethers of polyols, such as are available from the Shell Chemical Company, under the trade name "Eponite"), polyaziridinyl compounds such as tris(1-aziridinyl)phosphine oxide, tris(2-methyl-1-aziridinyl)-phosphine oxide, polyhalides such as polyepihalohydrins, polyhalophosphonates, and the like, monomeric and oligomeric phosphonitrilic halides and similar reactive compounds.

Methylolated compounds of this invention undergo an acid-catalyzed insolubilization reaction without the necessity for co-reactants. This valuable property makes it possible to insolubilize such N-(hydroxymethyl) derivatives of amido phosphonates in situ on a textile material. In the presence of an acid or acid-generating salt, such as magnesium chloride, zinc nitrate, or zinc tetrafluoroborate, hydroxymethyl groups undergo a condensation reaction with hydroxy groups, which results in insoluble derivatives of high molecular weight. Using Formula 25 for purposes of illustration, the following type of condensation occurs with a polymer such as cellulose (one reacted site of which is denoted by HO—Cell):

Equation (19)                                           Formula (26)

Inasmuch as J represents but one valence of several valences in the non-nitrogenous moiety of a polyphosphate, it is apparent that macromolecules of cellulose are crosslinked by such a reaction.

Similarly, polymethylolated derivatives of phosphonates of this invention can be insolubilized either in vitro or in situ without the addition of a co-reactant. The following type of acid-catalyzed reaction occurs, yielding resins of high P content.

Equation (20)

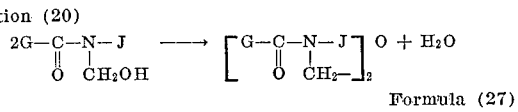

Formula (27)

When the formation of the crosslinked products heretofore described is carried out on textile materials, and particularly on cellulosic textiles, the textile is usually impregnated with a solution of the monomers, preferably an aqueous solution. The concentration of monomers required, of course, depends upon the type of textile material and upon the properties to be effected. For optimum durability of flame-retardant properties on cellulosic fabrics, solutions containing from about 10% to about 30% total reactants by input, are sastisfactory. When a co-reactant for the polyamino phosphonate is used, the ratio of polyamino phosphonate to co-reactant can be varied according to the identity of the co-reactant. Thus, for example, when the co-reactant is tris(1-aziridinyl)-phosphine oxide, ratios of 3:1 to 1:3 of polyamino phosphonate to tris(1-aziridinyl)phosphine oxide are preferred. The pH of the textile treating solution may range from about 5 to about 10. After treating with the monomer solution, the textile is dried and heated (cured) to effect insolubilization. Heating at temperatures above 100° C. is generally desirable in order to accelerate the reaction with a heating cycle of from 2 to 20 minutes at 125° C. to 175° C. being preferred. After heating, the treated textile is washed to remove residual soluble compounds. Cellulosic textiles treated in this manner do not support combustion, and this property is unimpaired even after 100 launderings. Moreover, the tensile strength of the treated cellulosic textile is not significantly reduced. It is also worthy of note that the solubility and excellent chemical compatibility of the polyamino phosphonates make it possible to apply these flame-retardant finishes in conjunction with other finishing agents, such as softeners.

In the examples which follow, all parts given are by weight unless otherwise indicated.

The test results reported were obtained according to the following test methods:

Vertical flame resistance—AATCC 34–1952 (in inches)
Ellipse flame resistance—ADR 53, 812 (1964) (in mm.)
Stiffness—cantilever procedure—ASTM D–1388–55T (in mg./cm.$^2$)
Tensile strength—Ravel Strip Method—ASTM D–1682–59T (in lbs.)
Tear strength—ASTM D–1425–63 (in lbs.)
Abrasion resistant Stoll Flex Abrader—2 lbs. head, 5 lbs. toggle, ASTM D–1175–61T (in cycles)
Crease recovery—ASTM D–1295–60T (angle measured in degrees, total of warp and filling directions, W+F)
Laundering—Samples laundered in automatic home-type agitator washing machine at 140° F. for the full cycle, 5-lb. load. Samples flat-bed pressed.

Alkaline scouring—Samples heated at 95° C. in an aqueous solution containing 2 g./l. sodium carbonate and 5 g./l. detergent. Fabric:liquor ratio 1:50. The scoured samples neutralized in dilute acetic acid solution, rinsed thoroughly in water and dried.

Damage due to retained chlorine—AATCC 92–1962 (percent strength lost)

EXAMPLE 1

Amination of the halophosphonate of Formula 3 with ethylenediamine (a) Preparation of

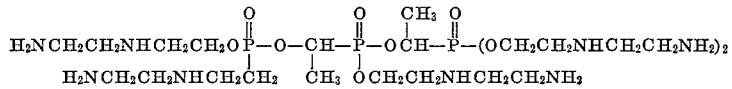

Into a three-necked flask equipped with a mechanical stirrer, a thermometer, a reflux condenser and a dropping funnel were charged 48.1 parts of ethylenediamine dissolved in 50 parts of isopropyl alcohol. Into the stirred solution, kept at 25° C., 97.7 parts of the halogenated phosphonate dissolved in 50 parts of isopropyl alcohol were added over a period of 1 hour. The reaction was slightly exothermic. After the addition was completed, the reaction solution was heated slowly to reflux (85° C.).

Samples were withdrawn periodically for the argentometric determination of ionic chloride formed and for the determination of water solubility. The reaction product became completely water-soluble in 4 hours and, from the ionic chloride determination, the amination was 100% complete in 9 hours. The reaction product was then cooled to 30 to 35° C., and 200 parts of isopropyl alcohol, 55.2 parts of potassium carbonate and 10.0 parts water were added to the viscous solution. The mixture was stirred at 30 to 35° C. for several hours and, after standing overnight, was filtered to separate the inorganic salt precipitated. The solvent was distilled under vacuo at 90° C. from the homogeneous filtrate, and the product was recovered as a yellowish solid residue. Argentometric titration of the water-soluble product showed that it still contained 5.6% ionic chloride. The bound chlorine content was 1.31% determnied by saponification followed by argentometric titration. This corresponded to 96.5% completion of the amination reaction of the chloro groups in the halogenated phosphonate. On the basis of the weight of recovered product, the yield of the amination was 97%. Elemental analysis of the product isolated showed the polyamino phosphonate contained 10.39% P, 12.80% N.

(b) Preparation of

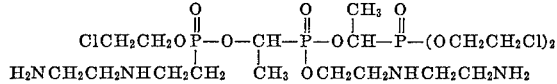

The preparation was repeated as in part (2) with the exception that 24.0 parts of ethylenediamine were used. After 12 hours reaction at reflux temperature, the reaction product was isolated in the same manner as in part (a) and from the analysis (saponification followed by argentometric titration) of the water-soluble solid isolated, the amination of the chloro groups in the halogenated phosphonate was 80.0% complete, calculated on the basis of the amount of ethylenediamine used.

(c) The preparation was repeated as in part (a) with the exception that 4.8 parts of ethylenediamine were used. The reaction product remained water-insoluble during the course of reaction. After 8 hours at reflux temperature, the reaction product was recovered in the same manner as in part (a). The analysis (saponification followed by argentometric titration) of the water-insoluble product isolated indicated that 1 out of the 5 chloro groups in the halogenated phosphonate was aminated.

EXAMPLE 2

Preparation of a polyamino phosphonate by amination of the halophosphonate of formula 3 with ethylenediamine Into a three-neck flask equipped with a stirrer, a thermometer, reflux condenser and a dropping funnel were charged 90 parts of ethylenediamine dissolved in 50 parts of ethylene glycol. Into the solution 183 parts of the halogenated phosphonate in 50 parts of ethylene glycol were added over a period of one-half hour. The reaction was exothermic and the temperature was maintained at 110 to 115° C. with occasional cooling. Samples were withdrawn periodically for the argentometric determination of ionic chloride. The amination leveled off at 98% completion in 1 hour. The final product may be represented by the formula

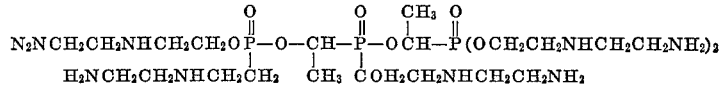

The reaction mixture was cooled to 80° C. and then 25 ml. of water and 120 parts of 50% aqueous sodium hydroxide solution were added. The resulting solution could be diluted to any desired concentration and employed without further purification.

EXAMPLE 3

Preparation of a polyamino phosphonate by amination of the halophosphonate of Formula 3 with aqueous ammonia Into a three-necked flask equipped with a mechanical stirrer, a thermometer, a reflux condenser and a dropping funnel 90.6 parts of 28–30% ammonium hydroxide and 50.0 parts of isopropyl alcohol were charged. Into the stirred solution kept at 25° C., 97.7 parts of the halogenated phosphonate dissolved in 50 parts isopropyl alcohol were added over a period of 1 hour. The reaction was slightly exothermic. Samples were withdrawn periodically for the argentometric determination of ionic chloride formed and for the determination of water solubility. The reaction mixture was kept at 35 to 40° C. for 8 hours and was slowly heated to 85° C. and kept at this temperature until no further increase of ionic chloride formation. The reaction mixture turned completely water-soluble in 10 hours. The reaction product was recovered in the same manner as shown in Example 1. The analysis (saponification followed by argentometric titration) of the water-soluble viscous product indicated that the amination of the chloro groups was 90% complete. The final product may be represented by the formula

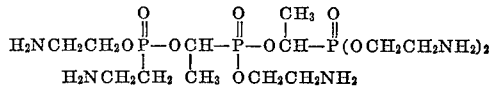

15

EXAMPLE 4

Preparation of a polyaziridinyl phosphonate by amination of the halophosphonate of Formula 3 with ethylenimine Into a three-necked flask equipped with a stirrer, a thermometer, a reflux condenser and a dropping funnel were charged 550 parts potassium bicarbonate and 610 parts of the halogenated phosphonate dissolved in 300 parts of ethyl alcohol. To the solution, kept at 25 to 30° C., 242 parts of ethylenimine were added over a period of 1 hour. The reaction was slightly exothermic. The reaction solution was then gently heated to 55° C. and kept at this temperature. After 26 hours, the inorganic salt and the excess of the inorganic base precipitated were filtered off. The solvent was then distilled off under vacuo at 25 to 30° C. Analysis (saponification followed by argentometric titration) of the water-soluble viscous residual product showed the amination of the chloro groups was 93% complete. The final product may be represented by the formula:

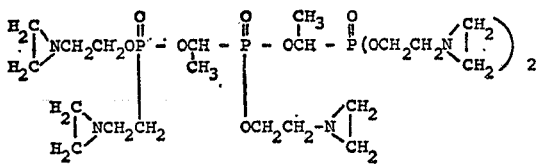

Determination of the aziridinyl content by the method of Schaefer (Journal American Chemical Society 77, 5918–5922, 1955) gave an aziridinyl equivalent weight of 132.0 compared with a calculated valve of 128.5 for the halogenated phosphonate wherein every chlorine has been replaced with an aziridinyl group,

EXAMPLE 5

Preparation of a polyaziridinyl phosphonate by amination of the halophosphonate of Formula 3, with 2-methylaziridine Into a three-necked flask equipped with a stirrer, a thermometer, a reflux condenser and a dropping funnel were charged 16.6 parts of potassium carbonate and 24.4 parts of the halogenated phosphonate dissolved in 100 parts of isopropyl alcohol. Into the stirred solution kept at 25 to 30° C., 13.7 parts of 2-methylaziridine dissolved in 100 parts of isopropyl alcohol were added over a period of one-half hour. The reaction mixture was then heated to 85° C. and maintained at this temperature. After 22 hours, the inorganic salt and the excess of inorganic base precipitated were separated and the solvent was distilled off under vacuo at 30 to 35° C. Analysis (saponification followed by argentometric titration) of the water-soluble product showed the amination of the chloro groups in the halogenated phosphonate was 78% complete. The final product may be represented by the formula

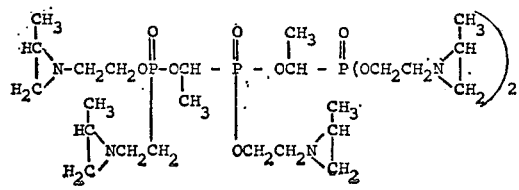

EXAMPLE 6

Preparation of a polyamino phosphonate by amination with ethylenediamine of the product resulting from the action of triethyl phosphite on the halophosphonate of Formula 3

Into a three-necked flask equipped with a stirrer, a thermometer, a reflux condenser were charged 305.3 parts of the halogenated phosphonate and 830.0 parts of triethyl phosphite. The reaction mixture was heated to reflux at 145 to 150° C. for 40 hours. The excess triethyl phosphite was then distilled off under vacuo at 95° C. and analysis of the water-insoluble viscous reaction product showed that 60% of the chloro groups in the halogenated phosphonate had been replaced with diethyl phosphonate radicals.

Two hundred parts of the product prepared as described above were aminated with 45 parts of ethylenediamine in the same manner as described in Example 1. After 24 hours at reflux temperature, the reaction product was isolated in the same manner as in Example 1. The analysis (saponification followed by argentometric titration) of the recovered water-soluble solid product indicated that 75% of the chloro groups present in the rearranged product had been aminated. The final product may be represented by the formula

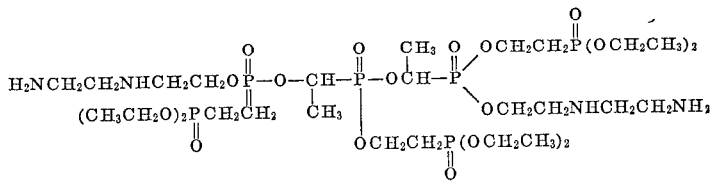

EXAMPLE 7

Preparation of phosphoramide derivative of a polyamino phosphonate by amidation with phosphorus oxychloride Into a three-necked flask equipped with a stirrer, a thermometer, a reflux condenser and a dropping funnel were charged 50 parts of the polyamino phosphonate prepared according to Example 3 and 100 parts of water. Into the stirred solution, kept at 5–10° C., 3.0 parts phosphorus oxychloride, dissolved in 50 parts benzene, were added. The reaction mixture was stirred at 10° C. for 3 hours and the organic layer was separated and discarded. The aqueous layer was then stripped under vacuo and further neutralized with potassium carbonate in isopropyl alcohol to liberate the free organic base of the phosphoramide derivative which was still completely water-soluble. Elemental analysis of the derivative prepared showed a 13.2% phosphorus content compared with the 11.6% phosphorus content of the polyamino phosphonate of Example 3.

EXAMPLE 8

Preparation of epoxy derivative of a polyamino phosphonate by etherification with epichlorohydrin Into a three-necked flask equipped with a stirrer, a thermometer, a reflux condenser and a dropping funnel were charged 100 parts of the polyamino phosphonate prepared in Example 3. To the solution, kept at 24 to 30° C., 28.0 parts of epichlorohydrin were added and the solution was stirred for another 2 hours. Into the homogeneous solution 30.6 parts of triethylamine were added over a period of 1 hour and the mixture was stirred for another 5 hours. The precipitate formed during this time was filtered off. This by-product (7.3 parts) was found to be triethylamine hydrochloride. The solvent was then distilled off under vacuo at room temperature and a viscous liquid was recovered. Analysis (hydrochlorination with aqueous magnesium chloride) showed the product had an oxirane oxygen content of 0.84% corresponding to 0.53 milliequivalent of epoxy groups per gram of product.

EXAMPLE 9

Preparation of a polyamino phosphonate by amination of bis(2-chloroethyl) (2-chloroethyl)phosphonate with ethylenediamine Into a reaction flask containing 6.0 parts of bis(2-chloroethyl) (2-chloroethyl)phosphonate and 2.6 parts of dimethyl sulfoxide kept at 25° C. with occasional cooling were added slowly 1.8 parts of ethylenediamine. Samples were withdrawn periodically for the determination of ionic halide argentometrically. The amination leveled off at 83.5% completion in 168 hours at 25° C., as determined from the ionic chloride titration. The final product may be represented by the formula:

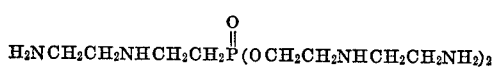

EXAMPLE 10

Gelation of a polyamino phosphonate with tris(1-aziridinyl)phosphine oxide and with a polyepoxide The polyamino phosphonate prepared as described in Example 1 was reacted with tris(1-aziridinyl)phosphine oxide and with a polyepoxide composed of poly(2,3-epoxypropyl) ethers of polyols (Eponite 100, product of Shell Chemical Co.). This gelation experiment consisted of weighing into a weighing dish varying amounts of either the polyaziridine or the polyepoxide with 1.0 gram of the polyamino phosphonate by using methanol-water mixture as diluent. The dish with its contents was first heated in an oven at 80° C. for 20 minutes to evaporate the diluent and was then cured at 110 to 120° C. in a forced draft oven for 20 minutes. The glass-like gels formed were rinsed three successive times with 25 grams of water each time. The washed resin was then separated by filtration and the solid was dried in an oven at 150° C. to constant weight. The weight difference before and after gelation (with the subsequent washing and drying) was taken to measure the percent yield of insoluble polymer formed from the two co-reactants. The following results were obtained:

| Sample: | Parts of tris(1-aziridinyl) phosphine oxide per part of polyamino phosphonate | Percent yield of insoluble polymer |
|---|---|---|
| 1 | 1.2 | 80.0 |
| 2 | 2.4 | 73.0 |
| 3 | 3.9 | 91.0 |
| 4 | 5.9 | 96.0 |
| 5 | 7.9 | 73.0 |

| Sample: | Parts of Eponite 100 per part of polyamino phosphonate | |
|---|---|---|
| 6 | 0.3 | 48.0 |
| 7 | 0.4 | 50.0 |
| 8 | 0.5 | 73.0 |

EXAMPLE 11

Gelation of a polyamino phosphonate with tris(1-aziridinyl)phosphine oxide and with a polyepoxide The polyamino phosphonate prepared as described in Example 3 was gelled with tris(1-aziridinyl)phosphine oxide and with a polyepoxide (Eponite 100) according to the procedure described in Example 10. The following results were obtained:

| Sample: | Parts of tris(1-aziridinyl) phosphine oxide per part of polyamino phosphonate | Percent yield of insoluble polymer |
|---|---|---|
| 1 | 0.5 | 22.6 |
| 2 | 1.0 | 55.2 |
| 3 | 1.5 | 63.5 |

| Sample: | Parts of Eponite 100 per part of polyamino phosphonate | |
|---|---|---|
| 4 | 0.5 | 7.3 |
| 5 | 1.0 | 12.8 |
| 6 | 1.5 | 14.0 |

EXAMPLE 12

Gelation of a polyaziridinyl phosphonate with tris(1-aziridinyl)phosphine oxide, formaldehyde, and tetrakis hydroxymethyl)phosphonium chloride The polyaziridinyl phosphonate prepared as described in Example 4 was gelled with and without other polyfunctional co-reactants, e.g., tris(1-aziridinyl)phosphine oxide, tetrakis (hydroxymethyl)phosphonium chloride and Formalin (37% formaldehyde). The gelation was conducted in the same manner as described in Example 10.

(i) Self-crosslinking of polyaziridinyl phosphonate with and without zinc tetrafluoroborate as the catalyst

| Sample: | Percent Zn(BF₄)₂ based on the weight of polyaziridinyl phosphonate | Percent yield of insoluble polymer |
|---|---|---|
| 1 | 0 | 64.0 |
| 2 | 5 | 42.8 |
| 3 | 10 | 75.4 |

(ii) Gelation of polyaziridinyl phosphonate with tris(1-aziridinyl) phosphine oxide

| Sample: | Part of tris(1-aziridinyl)phosphine oxide per part of polyaziridinyl phosphonate | Percent yield of insoluble polymer |
|---|---|---|
| 4 | 0.1 | 71.0 |
| 5 | 0.3 | 74.0 |
| 6 | 0.5 | 72.6 |
| 7 | 0.8 | 67.2 |
| 8 | 1.0 | 74.5 |

(iii) Gelation of polyaziridinyl phosphonate with tetrakis(hydroxymethyl)phosphonium chloride (THPC)

| Sample: | Part of THPC per part of polyaziridinyl phosphonate | Percent yield of insoluble polymer |
|---|---|---|
| 9 | 0.1 | 48.0 |
| 10 | 0.3 | 26.0 |
| 11 | 0.5 | 20.0 |

(iv) Gelation of polyaziridinyl phosphonate with Formalin

| Sample: | Part of formaldehyde per part of polyaziridinyl phosphonate | Percent yield of insoluble polymer |
|---|---|---|
| 12 | 0.01 | 58.6 |
| 13 | 0.05 | 30.4 |
| 14 | 0.10 | 21.4 |

EXAMPLE 13

Gelation of a polyamino phosphonate with tris(1-aziridinyl)phosphine oxide

The polyamino phosphonate prepared as described in Example 6 was gelled with tris(1-aziridinyl)phosphine oxide in the same manner as described in Example 10.

| Sample: | Part of tris(1-aziridinyl)phosphine oxide per part of polyamino phosphonate | Percent yield of insoluble polymer |
|---|---|---|
| 1 | 0.5 | 55.4 |
| 2 | 0.8 | 68.0 |
| 3 | 1.0 | 67.0 |

EXAMPLE 14

Samples of cotton twill fabric (weight 8 oz./sq. yd.) were treated with a formulation comprising varying ratios of the product of Example 1 and tris(1-aziridinyl)phosphine (APO) oxide. The pH of the aqueous solution of the product of the Example 1 was adjusted to 9 by adding sodium hydroxide before the addition of the polyaziridine; 0.2% non-ionic wetting agent was added to the treating solution.

Before the treatment the fabric samples were dried at 105° C. and weighed in an analytical balance. The weighed samples were then treated with the reagent solution using a laboratory padder and setting the rolls at such a pressure as to give 85% wet pickup. The fabric samples so treated were framed to original dimensions and dried in a forced draft oven at 100° C. for 15 minutes, then cured at 135° C. for 15 minutes. After curing the samples were neutralized in dilute acetic acid solution, washed in a non-ionic detergent solution at 60 to 70° C., then dried at 105° C. and weighed on an analytical balance to determine the weight gain (W.G.) resulting from the treatment. The following results were obtained.

|  | Wt. ratio produce of Ex. 1 to APO | Percent total reagent applied OWF[1] | Percent W.G. | Percent P Found | Percent P Calcd. from W.G. | Percent N Found | Percent N Calcd. from W.G. |
|---|---|---|---|---|---|---|---|
| Sample: | | | | | | | |
| A | 1:2 | 23.0 | 18.0 | | | | |
| B | 1:2 | 19.9 | 16.3 | 2.22 | 2.27 | 3.15 | 3.16 |
| C | 1:1 | 22.7 | 18.5 | | | | |
| D | 1:1 | 19.7 | 17.1 | 2.13 | 2.24 | 2.80 | 3.17 |
| E | 2:1 | 23.0 | 17.0 | | | | |

[1] OWF = based on weight of fabric treated.

The properties of the treated samples were as follows:

|  | Cr. recov. (W and F),[1] degrees | Tensile str. F-lbs. | Tear str. F-lbs. | Stiffness warp (face) mg./cm.[2] | Char length in vertical flame test, inches |
|---|---|---|---|---|---|
| Sample: | | | | | |
| A | 240 | 55 | 3.0 | 1,150 | 4.2 |
| B | 245 | 66 | 3.2 | 1,380 | |
| C | 230 | 72 | 3.8 | 1,470 | 4.1 |
| D | 222 | 68 | 3.6 | 1,280 | 4.1 |
| E | 201 | 79 | 3.5 | 1,115 | 4.9 |
| Untreated control | | 71 | 6.2 | 940 | [2] BEL |

[1] Sum of angles for warp (W) and filling (F) directions.
[2] BEL: Burned entire length.

The treated samples were exposed to incremental alkaline scouring and the scouring was followed by flame retardancy tests and elemental analysis. The results obtained were as follows:

|  | Char. length in vert. flame test after scour of— | | | Analysis, percent after scour of— | | | | | | | |
|---|---|---|---|---|---|---|---|---|---|---|---|
|  | | | | 2 hours | | | | 5 hours | | | |
|  | | | | Found | | Ret. | | Found | | Ret. | |
|  | 2 hrs. | 5 hrs. | 8 hrs. | P | N | P | N | P | N | P | N |
| Sample: | | | | | | | | | | | |
| A | 3.6 | 4.3 | 3.9 | | | | | | | | |
| B | 3.4 | 3.9 | 4.3 | 1.9 | 2.89 | 86 | 92 | 1.73 | 2.53 | 78 | 80 |
| C | 3.5 | 4.6 | 5.2 | | | | | | | | |
| D | 3.9 | 4.2 | 5.1 | 1.70 | 2.21 | 80 | 79 | 1.39 | 2.23 | 65 | 80 |
| E | 5.2 | BEL | | | | | | | | | |

EXAMPLE 15

Example 14 was repeated and the treated samples wer exposed to multiple launderings at 60° to 70° C. in a home-type washing machine. The following results were obtained:

|  | Wt. ratio product of Ex. 1 to APO | Percent total reagent applied OWF | Percent W.G. | Analysis, percent | | | |
|---|---|---|---|---|---|---|---|
|  | | | | Found | | Calculated | |
|  | | | | P | N | P | N |
| Sample: | | | | | | | |
| A | 1:1 | 21.0 | 18.0 | 2.08 | 2.73 | 2.30 | 3.26 |
| B | 1:1 | 19.2 | 15.5 | 1.54 | 2.37 | 2.03 | 2.87 |

The treated samples were laundered and the effect of laundering was followed by flame retardancy tests and elemental analysis. The following results were obtained:

|  | Char length in vert. flame test after Launderings of— | | | | Percent P | | Percent N | |
|---|---|---|---|---|---|---|---|---|
|  | 0 | 10 | 30 | 50 | Found | Retd. | Found | Retd. |
| Sample: | | | | | | | | |
| A | 3.1 | 4.1 | 4.3 | 4.9 | 1.89 | 91 | 2.42 | 85 |
| B | 4.2 | 4.9 | 5.1 | 5.6 | 1.29 | 84 | 2.0 | 84 |

Other properties of the treated fabric were compared with those of the untreated control initially and after 50L (50 launderings) with the following results:

|  | Sample A | Sample B | Untreated control |
|---|---|---|---|
| Crease recovery (W and F) | 240 | 253 | 152 |
| Percent shrinkage after 50L: | | | |
| W | 3.2 | 5.0 | 11.0 |
| F | 1.5 | 1.0 | 2.5 |
| Tensile strength (F): | | | |
| Original | 67 | 66 | 79 |
| 50L | 62 | 65 | 93 |
| Tear strength (F): | | | |
| Original | 2.0 | 3.5 | 7.4 |
| 50L | 2.3 | 2.6 | 3.7 |
| Flex abrasion (W): | | | |
| Original | 500 | 200 | 850 |
| 50L | 525 | 375 | 500 |
| Percent damage due to retained chlorine | 1 | 10 | 6 |
| Stiffness (W): | | | |
| Original | 2,290 | 630 | 946 |
| 50L | 910 | 805 | 966 |

It is apparent that the treatment described in this example imparts to the cotton excellent flame retardant properties durable to 50L. The crease recovery of the fabric and its dimensional stability are greatly improved and no chlorine damage is noted. The decrease in tear strength and abrasion resistance can be partially or wholly compensated by after treatment with suitable lubricants such as polyethylene emulsions, cationic softeners and the like without impairing other desirable properties.

EXAMPLE 16

Example 14 was repeated but instead of the product of Example 1, the product of Example 2 was used in combination with tris(1-aziridinyl)phosphine oxide in a 1:1 weight ratio. The following results were obtained:

|  | Percent total reag. applied OWF | Percent W.G. | Char length in vert. flame test Orig. | Char length in vert. flame test After 30L |
|---|---|---|---|---|
| Sample: | | | | |
| B | 18.5 | 18.2 | 3.2 | 4.9 |
| C | 15.4 | 14.5 | 4.0 | 4.8 |
| D | 12.1 | 11.6 | 6.0 | BEL |

The physical properties of the treated samples were as follows:

|  | Tensile strength-F | Tear strength-F | Flex abrasion-W | Stiffness W |
|---|---|---|---|---|
| Sample: | | | | |
| B | 76 | 3.4 | 215 | 1,443 |
| C | 67 | 3.8 | 225 | 765 |
| D | 74 | 4.2 | 225 | 639 |
| Untreated control | 74 | 6.6 | 850 | 940 |

EXAMPLE 17

Example 14 was repeated, but instead of the product of Example 1, the product of Example 3 was used in combination with tris(1-aziridinyl)phosphine oxide in a 1:1 weight ratio. The results were as follows:

| Percent total reag. applied OWF | Percent W.G. | Analysis, percent Found P | Analysis, percent Found N | Analysis, percent Calcd. P | Analysis, percent Calcd. N | Retained after 50L, percent P | Retained after 50L, percent N |
|---|---|---|---|---|---|---|---|
| Sample: | | | | | | | |
| A — 24.6 | 14.2 | 1.83 | 2.05 | 2.22 | 2.35 | | |
| B — 26.5 | 18.8 | 2.48 | 2.28 | 2.94 | 3.11 | 83 | 97 |

The treated samples were exposed to incremental alkaline scouring with the following results:

| | Char length in inches in vert. flame test Sample A | Char length in inches in vert. flame test Sample B |
|---|---|---|
| Hours of scour: | | |
| 0 | 4.8 | 3.5 |
| 2 | 4.9 | 4.1 |
| 5 | 4.9 | 4.2 |
| 8 | 5.2 | 4.5 |

| | Analysis, percent Found P | Analysis, percent Found N | Analysis, percent Retnd. P | Analysis, percent Retnd. N | Analysis, percent Found P | Analysis, percent Found N | Analysis, percent Retnd. P | Analysis, percent Retnd. N |
|---|---|---|---|---|---|---|---|---|
| 2 | 1.78 | 1.85 | 97 | 90 | | | | |
| 5 | 1.32 | 1.47 | 72 | 72 | | | | |
| 8 | 1.25 | 1.64 | 68 | 80 | | | | |

The physical properties of Sample B were as follows:

|  | Sample B | Untreated control |
|---|---|---|
| Char length in inches (vertical flame test): | | |
| Original | 3.5 | |
| 10L | 4.0 | |
| 30L | 3.8 | |
| 50L | 4.0 | |
| Crease recovery (degrees W and F)—Original | 270 | 152 |
| Percent shrinkage after 50L: | | |
| W | 5.5 | 11.0 |
| F | 2.0 | 2.5 |
| Tensile strength-F: | | |
| Original | 60 | 79 |
| After 50L | 60 | 93 |
| Tear strength-F: | | |
| Original | 2.7 | 7.4 |
| After 50L | 2.1 | 3.7 |
| Flex abrasion-W: | | |
| Original | 150 | 850 |
| After 50L | 300 | 500 |
| Stiffness-W: | | |
| Original | 1,790 | 946 |
| After 50L | 1,193 | 966 |

EXAMPLE 18

Example 14 was repeated, but the product of Example 4 was used without any co-reactant in the presence and in the absence of $Zn(BF_4)_2$ catalyst.

|  | Percent reag. OWF | Percent catalyst OWF | Curing conditions | Wt. gain | Char length in ellipse flame test after scour of— 0 hr. | 2 hrs. | 5 hrs. | 8 hrs. |
|---|---|---|---|---|---|---|---|---|
| Sample: | | | | | | | | |
| A | 23.4 | | 160° C., 15 minutes | 14.7 | 7.7 | 11.3 | 15.0 | 16.0 |
| B | 22.8 | 1.6 | do | 14.9 | 5.3 | 11.0 | 14.3 | 20.3 |

EXAMPLE 19

Example 14 was repeated using the product of Example 4 in combination with tris(1-aziridinyl)phosphine oxide (APO). The following results were obtained:

| Wt. ratio of prod. of Ex. 4 to APO | Percent total reag. applied OWF | Percent W.G. | Analysis percent Found P | Analysis percent Found N | Analysis percent Calculated P | Analysis percent Calculated N |
|---|---|---|---|---|---|---|
| Sample: | | | | | | |
| A | 3:1 | 21.9 | 19.8 | 1.70 | 2.04 | 2.54 | 2.36 |
| B | 1:1 | 22.5 | 18.2 | 3.05 | 2.87 | 2.51 | 2.72 |
| C | 1:1 | 22.7 | 18.0 | 2.12 | 2.24 | 2.49 | 2.70 |

The treated samples were exposed to incremental alkaline scouring with the following results:

| | Char length in inches in vert. flame test of— | | |
|---|---|---|---|
| | Sample A | Sample B | Sample C |
| Hours of scour: | | | |
| 0 | 5.0 | 4.0 | 4.1 |
| 2 | 5.1 | 3.9 | 4.7 |
| 5 | 5.2 | 3.9 | 4.7 |
| 8 | 5.2 | 4.0 | 4.7 |

| | Analysis, percent | | | | | |
|---|---|---|---|---|---|---|
| | Found | | Retained | | Found | | Retained | | Found | | Retained |

| | P | N | P | N | P | N | P | N | P | N | P | N |
|---|---|---|---|---|---|---|---|---|---|---|---|---|
| 2 | 1.55 | 1.90 | 91 | 93 | 2.03 | 2.60 | 66 | 90 | | |
| 5 | 1.57 | 1.84 | 92 | 90 | 1.94 | 2.58 | 64 | 89 | | |
| 8 | 1.35 | 1.80 | 79 | 88 | 1.70 | 2.39 | 56 | 83 | | |

EXAMPLE 20

Example 14 was repeated but instead of the product of Example 1, the product of Example 6 was used in combination with tris(1-aziridinyl)phosphine oxide in a 1:1 weight ratio. The results were as follows:

| Percent total reag. applied OWF | Percent weight increase | Char length in inches vertical flame test after scour of— | | | |
|---|---|---|---|---|---|
| | | 0 hr. | 2 hrs. | 5 hrs. | 8 hrs. |
| 19.9 | 11.5 | 4.2 | 5.6 | 5.3 | 7.0 |

EXAMPLE 21

Preparation of a polyamino phosphonate by amination of the Halophosphonate of Formula 3 with methylamine Into a three-necked flask equipped with a mechanical stirrer, a thermometer, a reflux condenser, a dropping funnel and a gas inlet tube were charged 200 g. of 2-propanol. Methylamine gas was bubbled into the alcohol at room temperature for 15 minutes. Then 610.5 g. (1.00 mole) of the halogenated phosphonate dissolved in 800 g. of 2-propanol were added dropwise to the amine-saturated solution while maintaining the flow of amine gas. The reaction was slightly exothermic and the temperature was kept at 60° to 65° C. After the addition was completed, the reaction mixture was heated gradually to reflux at 85° C. Samples of the reaction mixture were withdrawn periodically for the argentometric determination of ionic chloride. The amination was halted in 60 hours when no further increase of ionic chloride formation was observed.

The methylamine hydrochloride formed during reaction was filtered off and the 2-propanol was then stripped off under vacuum to recover a very viscous liquid. Analysis (saponification followed by argentometric titration) of the water-soluble viscous product indicated that the amination of the chloro groups was 98% complete. The final product may be represented by the formula $$\underset{\underset{H_3CNCH_2CH_2\ CH_3\ OCH_2CH_2NCH_3}{\overset{H}{|}\quad\quad\quad\overset{H}{|}}}{\overset{H}{H_3CNCH_2CH_2O}}\overset{O}{\underset{||}{P}}-OCH-\overset{O}{\underset{||}{\underset{CH_3}{P}}}-OCH-\overset{O}{\underset{||}{P}}(OCH_2CH_2NCH_3)_2$$

EXAMPLE 22

Preparation of a poly[bis-(2-hydroxyethylamino)] phosphonate by amination of the halophosphonate of Formula 3 with 2,2'-iminodiethanol Into a three-necked flask equipped with a mechanical stirrer, a thermometer, a reflux condenser, a dropping funnel were charged 525.7 g. (5.00 moles) of 2,2'-iminodiethanol, 550.0 g. (5.5 moles) of potassium bicarbonate and 100 g. of 2-propanol. Into the stirred mixture, kept at 25° C., 610.5 g. (1.0 mole) of the halogenated phosphonate dissolved in 400 g. of 2-propanol was added dropwise. No exotherm was observed during addition. After addition, the reaction mixture was heated gradually to reflux at 85° C. Samples were withdrawn periodically for argentometric determination of chloride ion formation. The amination was halted in 50 hours time when no further increase of ionic chloride formation was observed.

The potassium chloride formed during the amination was filtered off and the 2-propanol and water were stripped off under vacuum to recover a very viscous liquid. Analysis (saponification followed by argentometric titration) of the water-soluble product indicated that the amination at the chloro sites was 95% complete. The final product may be represented by the formula

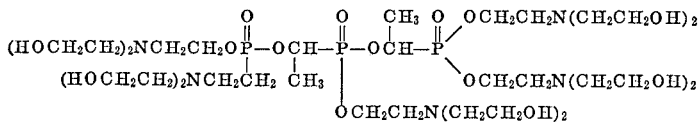

EXAMPLE 23

Preparation of a polyhydrazino phosphonate by amination of the halophosphonate of Formula 3 with hydrazine Into a three-necked flask equipped with a mechanical stirrer, a thermometer, a reflux condenser and a dropping funnel were charged 33.6 g. of 95% hydrazine (1.0 mole) dissolved in 100.0 g. of 2-propanol. Into the stirred solution kept at 25° C. was added dropwise 122.1 g. (0.2 mole) of the halogenated phosphonate dissolved in 150.0 g. of 2-propanol. No exothermic reaction was observed. After addition, the reaction mixture was heated gradually to reflux at 85° C. Samples were withdrawn periodically for argentometric determination of ionic chloride formation.

The amination was discontinued in 10 hours time when no further increase of ionic chloride formation was observed. At this time, 138.0 g. (1.0 mole) of potassium carbonate slurried in 100 g. of methanol were added to the reaction mixture to liberate the free amine. The product was recovered after the potassium chloride was filtered off and the solvents stripped under vacuum. Analysis of the water-soluble and viscous product (saponification followed by argentometric titration) indicated that 85% of the chloro sites in the halophosphonate were aminated. The final product may be represented by the formula

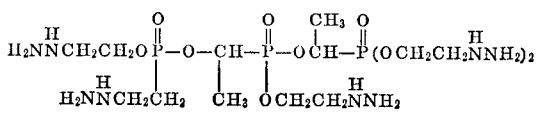

EXAMPLE 24

Preparation of a polyamino phosphonate by amination of the halophosphonate of Formula 3 with dodecylamine Into a three-necked flask equipped with a mechanical stirrer, a thermometer, and a reflux condenser were charged 122.10 g. (0.20 mole) of the halogenated phosphonate, 185.4 g. (1.0 mole) of dodecylamine, 138.0 g. (1.0 mole) of potassium carbonate and 300.0 g. of 2-propanol. The reaction mixture was heated gradually to reflux at 85° C. Samples were withdrawn periodically for argentometric titration of the formation of ionic chloride.

The amination was stopped when no further increase of ionic chloride formation was observed.

The aminated product was isolated after the inorganic chloride formed was filtered off and the solvents were stripped under vacuum. The product was an oily viscous liquid which was water-insoluble but soluble in alcohols, benzene, chloroform and hexane. Analysis of the product (saponification followed by argentometric titration) indicated that the chloro sites in the halogenated phosphonate were fully aminated. The final product may be represented by the formula

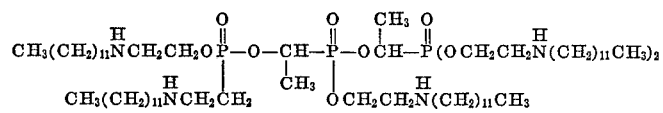

EXAMPLE 25

Preparation of a polyamino phosphonate by amination of the halophosphonate of Formula 3 with octadecylamine Into a three-necked flask equipped with a mechanical stirrer, a thermometer, a reflux condenser were charged 61.05 g. (0.1 mole) of the halogenated phosphonate, 135.0 g. (0.5 mole) of octadecylamine, 69.0 g. (0.5 mole) of potassium carbonate and 300.0 g. of 2-propanol. The mixture was heated gradually to reflux at 85° C. Samples were withdrawn periodically for argentometric determination of ionic chloride. The amination was discontinued in 40 hours when no further increase of ionic chloride formation was observed.

The aminated product was recovered as a waxy solid (M.P. 36 to 38° C.) after the inorganic materials were filtered off and the solvents were stripped off under vacuum. Analysis of the product (saponification followed by argentometric titration) indicated that the chlorine atoms in the halogenated phosphonate were fully replaced. The aminated product, which was water-insoluble but soluble in alcohols, benzene, hexane and chloroform, may be represented by the formula

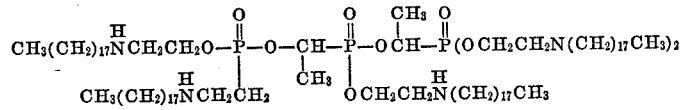

EXAMPLE 26

Spinning of polypropylene-polyaminophosphate mixture and dyeing of the filament obtained from the mixture Polypropylene pellets, 3 mm. x 3 mm. x 1.5 mm. in size, sold under the trade name "ESCON 305" by Enjay Company, Inc. (melt index 7.1, intrinsic viscosity 2.12, and 94.2% isotractic) were spray-coated with 6% of the polyamino phosphonate prepared in Example 25 from a benzene solution. The spray-coated pellets were first dried at 65° C. in a draft oven for 15 minutes and were then dried at 130° C. for 6 hours. The dried and cooled coated pellets were spun at 260° C. at a screw pressure of 1500 p.s.i. The filament obtained was drawn and converted into a knitted fabric.

Samples of the knitted fabric were dyed with the following dyes, together with samples from unmodified polypropylene filament.

(1) Eastman Blue BNN (C.I. Disperse Blue 3)
(2) Eastone Red B (C.I. Disperse Red 30)
(3) Polar Red 3B (Acid Red 134)

While the knitted samples containing 6% polyamino phosphonate were dyed to a bright shade with the aforementioned dyes, the untreated samples were not colored at all.

EXAMPLE 27

Reaction of the halophosphonate of Formula 3 with polymeric 2-methylaziridine

The halogenated phosphonate was gelled with polymeric 2-methylaziridine into an insoluble film. The gelation was carried out according to the procedures of Example 10 with the exception that methanol was used as the diluent. The insolubilized materials were extracted with benzene, methanol, water and then methanol. The extracted materials were then dried in an oven at 150° C. to constant weight. The following results were obtained:

| Sample: | Parts of polymeric 2-methylaziridine | Parts of halophosphonate | Yield of insolubilization, percent |
|---|---|---|---|
| 1 | 0.47 | 1.0 | 65.0 |
| 2 | 0.37 | 1.0 | 51.6 |
| 3 | 0.28 | 1.0 | 43.4 |

EXAMPLE 28

Gelation of Polyamino phosphonate with chlorosulfonated polyethylene

The polyamino phosphonate prepared in Example 1 was gelled with chlorosulfonated polyethylene into an insoluble elastic film. The chlorosulfonated polyethylene used was manufactured by E. I. du Pont de Nemours & Co., Inc.), under the trade name Hypalon 20, the repeating unit of that polymer having the following approximate structure, where $p$ is the ratio of carbon-bond Cl to sulfur-bound Cl:

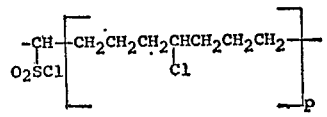

The gelation was carried out according to the procedure described in Example 10, except a methanol-toluene mixture was used as the diluent. The insolubilized materials obtained were extracted with toluene, acetone, water and then acetone. The extracted materials were then dried in an oven at 150° C. to constant weight. The following results were obtained:

| Sample: | Parts of polyamino phosphonate | Parts of chloro-sulfonated polyethylene | Yield of insolubilization, percent |
|---|---|---|---|
| 1 | 1.0 | 0 | 0 |
| 2 | 1.0 | 1.0 | 85.6 |
| 3 | 0.8 | 1.0 | 91.5 |
| 4 | 0.5 | 1.0 | 97.5 |
| 5 | 0.3 | 1.0 | 99.3 |
| 6 | 0.1 | 1.0 | 92.8 |
| 7 | 0 | 1.0 | 0 |

EXAMPLE 29

Preparation of a polyguanidino phosphonate by reaction of guanidine with the halophosphonate of Formula 3

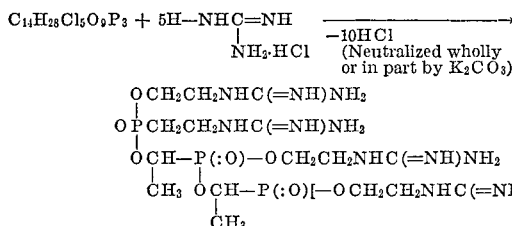

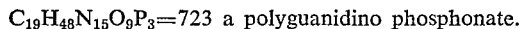

$C_{19}H_{48}N_{15}O_9P_3 = 723$ a polyguanidino phosphonate.

In a series of preparations in which the amounts of neutralizing base and solvent are varied, the following compounds are refluxed for 10 to 15 days at 90 to 100° C.;

610 g. (1 mole) of an industrial grade of chlorinated phosphonate whose principal component ($C_{14}H_{28}Cl_5O_9P_3$) has the type of structure shown in Formula 3;

478 g. (5 moles) of guanidine hydrochloride;

345 to 697 g. (2.5 to 5.0 moles) of potassium carbonate;

2 to 3 liters of 1-propanol; and 100 to 200 grams of water.

At the end of the refluxing period, conversions of 70 to 98% are shown by analysis of the supernatant liquid for chloride (bound as well as ionic). At this point, by-product potassium chloride and any residual ingredients are removed by filtration. That is followed by removal of solvents by distillation at reduced pressure until the remaining product weighs 750 to 820 grams. For complete replacement of chloro by guanidino, the theoretical yield would be 723 g. (1.0 mole), but that is not entirely achieved on the average. The product is amber-colored and water-soluble. For an evaluation of this product on cellulose-containing textile material, refer to Example 33.

Experience in several runs is that the resulting product has the following analysis:

| | Range found | Required by $C_{19}H_{48}N_{15}O_9P_3$ |
|---|---|---|
| N, percent | 16.4 to 22.5 | 29.0 |
| P, percent | 10.2 to 11.8 | 12.8 |
| N atoms/P atoms | 4.2:1 to 4.85:1 | 5:1 |
| Bound Cl, percent | 0.3 to 1.2 | 0 |
| Chloride ion, percent | 3 to 7 | 0 |

EXAMPLE 30

Preparation of a polyureido phosphonate by reaction of urea with the halophosphonate of Formula 3

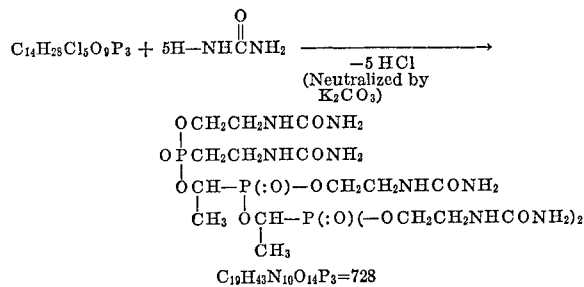

$C_{19}H_{43}N_{10}O_{14}P_3 = 728$

A polyureido phosphonate.

The following compounds are heated at 100 to 130° C. for 7 days with agitation: 732 g. (1.2 moles) of an industrial grade of chlorinated phosphonate having the type of structure shown in Formula 3, 360 g. (7.8 moles) of urea, 414 g. (3.0 moles) of potassium carbonate, and 2.5 liters of bis(2-methoxyethyl) ether. Then an additional 50 g. (0.36 mole) of potassium carbonate and 50 g. (1.1 mole) of urea are added. The mixture becomes progressively more and more difficult to stir. After an additional day of stirring at 130° C., the supernatant liquid is removed by decantation. The residue is dissolved in hot methanol, is filtered, and the filtrate is mostly stripped of solvent leaving 830 grams of yellow viscous liquid. For complete replacement of chloro by ureido, the theoretical yield would be 728 grams for a solvent-free product of 100 purity.

*Analysis.*—All of the N was of the amido type, inasmuch as titration of a sample, with aqueous hydrochloric acid indicated the absence of amino N.

| | Found | Required by $C_{19}H_{43}N_{10}O_{14}P_3$ | Indicated purity |
|---|---|---|---|
| N, percent | 14.53 | 19.22 | 75.6 |
| P, percent | 9.54 | 12.75 | 74.8 |
| N atoms/P atom | 3.37:1 | [1] 3.33:1 | |
| Bound Cl, percent | 0.42 | 0 | |
| Chloride ion, percent | 0.5 | 0 | |

[1] Or 10:3.

Example 31

POLYMETHYLOLATION OF A POLYUREIDO PHOSPHONATE BY MEANS OF FORMALIN

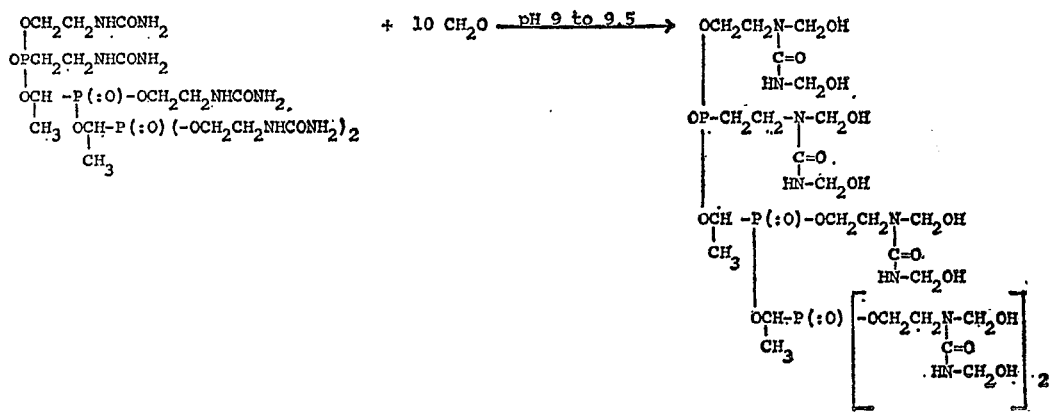

A solution of 435 grams of the product of the preceding example and 375 grams of water is adjusted to pH 9.5 with 6-normal sodium hydroxide. That solution is treated with 365 grams of 37% aqueous formaldehyde (4.5 moles), also previously adjusted to pH 9.5. The mixture is maintained at pH 9 to 9.5 for two 7-hour days of heating at 60 to 70° C., after which it is neutralized to pH 7. The resulting solution contains polymethylolated polyureido phosphonate. This solution is suitable for direct use to impregnate cellulose-containing textile material, as illustrated in Example 34.

ANALYSIS OF THE SOLUTION

| | Percent |
|---|---|
| N | 4.7 |
| P | 3.1 |
| Total formaldehyde (chromotropic acid procedure) | 8.21 |
| Unbound formaldehyde (hydroxylamine hydrochloride procedure) | 2.28 |
| Bound N-hydroxymethyl groups (by difference) | 5.93 |

EXAMPLE 32

Polymetholation of a polyureido phosphonate by means of paraformaldehyde

A solution of 378 grams of the product of Example 30 and 322 grams of water is heated with 123 grams of 95% paraformaldehyde (equivalent to 3.9 moles of formaldehyde) at pH 8 to 9 for two 7-hour days at 60 to 70° C. The resulting clear solution contains polymethylolated polyureido phosphonate capable of being reacted with cellulosic hydroxyls through its N-hydroxymethyl groups.

ANALYSIS OF THE SOLUTION
[Procedure as in Example 31]

| | Percent |
|---|---|
| Total formaldehyde | 12.47 |
| Unbound (free) formaldehyde | 2.99 |
| Bound N-hydroxymethyl groups | 9.48 |

EXAMPLE 33

Application of polyguanidino phosphonate to cotton twill

Samples of 100% cotton fabric in a twill weave and weighing 8 ounces per square yard are conditioned at a relative humidity of 65% and are weighed on an analytical balance. Then they are impregnated from pad batch of various percentages of active reagent as shown in the table. The solvent is water. The reagent is polyguanidino phosphonate, product of Example 29. The deposition is carried out on a laboratory padder so as to deposit approximately 3.0, 2.5, 2.0, 1.5, and 1% P, respectively, in the fabric. The fabric samples so treated are dried at about 65° C. and are not washed. Data are as follows:

EXAMPLE 34

Application of polymetholated polyureido phosphonate to cotton twill

Samples of 100% cotton fabric in a twill weave and weighing 8 ounces per square yard are conditioned at a relative humidity of 65% and are weighed on an analytical balance. Then they are impregnated from a pad bath composed of the aqueous solution resulting from Example 31. The wet pick-up of the reagent, polymetholated polyureido phosphonate, is 68%. The actual weight gain is 25% on an oven-dry basis. Analytical determinations for deposited N and P show 1.93% and 1.91%, respectively. The fabric so treated is more flame retardant than untreated cotton fabric.

Any departure from the above description which conforms to the present invention is intended to be included within the scope of the invention as defined by the following claims.

What is claimed is:

1. Nitrogen-containing phosphonates having the formula

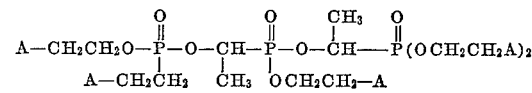

wherein A is a monovalent radical selected from the group consisting of

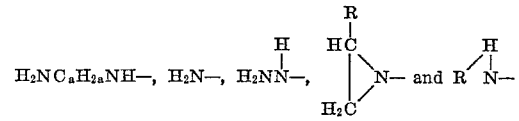

where $a$ is an integer of from 2 to 6, R is hydrogen or alkyl of 1 to 4 carbon atoms and R' is alkyl of 1 to 18 carbon atoms.

2. Nitrogen-containing phosphonates having the formula

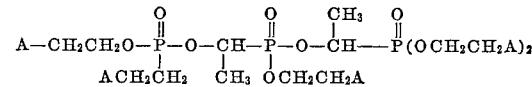

wherein A is a monovalent radical selected from the group consisting of

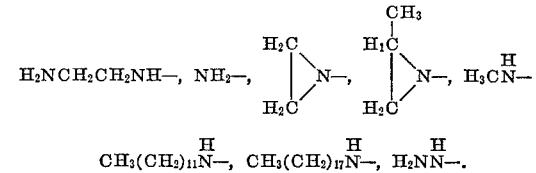

3. A compound according to claim 2,

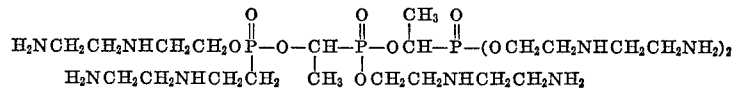

4. A compound according to claim 2,

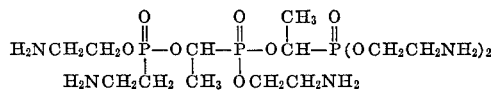

| | Reagent, percent, on wt. of bath | Wet pickup, percent | Reagent, percent, on wt. of fabric | Found, percent P | Found, percent N | Char length, vertical flame test, inches |
|---|---|---|---|---|---|---|
| Sample: | | | | | | |
| A | 54 | 62 | 34.4 | 2.99 | 7.03 | 2.6 |
| B | 40 | 61 | 24.4 | 2.36 | 6.35 | 2.9 |
| C | 31 | 60 | 18.6 | 1.85 | 5.26 | 3.1 |
| D | 23 | 56 | 12.9 | 1.45 | 4.37 | 3.5 |
| E | 16 | 52 | 8.3 | 1.02 | 3.06 | 4.9 |

5. A compound according to claim 2,

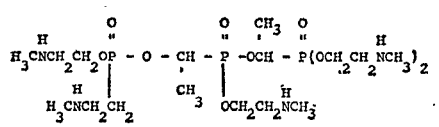

6. A compound according to claim 2,

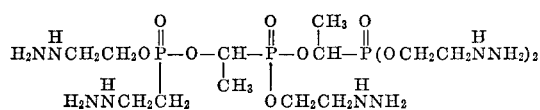

7. A compound according to claim 2,

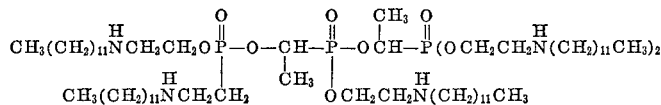

8. A compound according to claim 2,

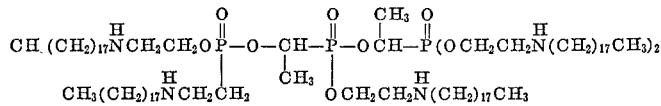

9. A compound according to claim 2, having the formula

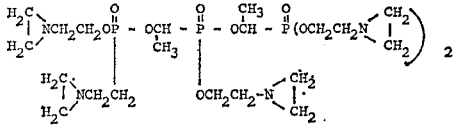

10. A compound according to claim 2, having the formula

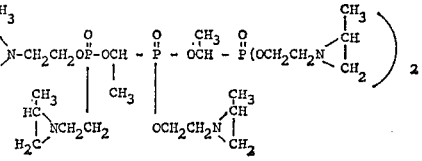

References Cited
UNITED STATES PATENTS
3,372,130   3/1968   Chess et al. _____ 260—931

OTHER REFERENCES

"Ethylenimine" (Technical Bulletin, Dow Chemical Company, reprinted December 1963), p. 9.

ALTON D. ROLLINS, Primary Examiner

U.S. Cl. X.R.

106—15 FP, 176, 177; 117—136; 252—8.1; 260—2 P, 72 R, 96 R, 923, 931, 938, 941, 943, 944, 945

UNITED STATES PATENT OFFICE
CERTIFICATE OF CORRECTION

Patent No. 3,658,791                    Dated April 25, 1972

Inventor(s) Giuliana C. Tesoro, Wing-Kai Lee and Kelvin B. Domovs

It is certified that error appears in the above-identified patent and that said Letters Patent are hereby corrected as shown below:

Col. 3, line 3, "O" should read -- Q --; Col. 3, line 56, the beginning of Formula (2) "$(ClCH_2CH_2)_2$" should read -- $(ClCH_2CH_2O)_2$ --; Col. 4, line 14, "R'" should read -- $R^V$ --; Col. 6, line 70, "valance" should read -- valence --; Col. 6, lines 74 and 75, "phorphoramide-polyphonates" should read -- phosphoramide-polyphosphonates --; Col. 10, Equation (18) should read -- $H-N-C-N-G + 2HCHO \rightarrow HOCH_2-N-C-N-G$ --;
            J  O  H                              J  O  CH$_2$OH Col. 12, lines 13 and 14, "polyphosphate" should read -- polyphosphonate --; Col. 12, line 36, "sastisfactory" should read -- satisfactory --; Col. 12, line 70, "ASTM D-1425-63" should read -- ASTM D-1424-63 --; Col. 12, line 71 "resistant" should read -- Resistance --; Col. 13, line 54, "determnied" should read -- determined --; Col. 14, line 23, -- a -- should be inserted before "reflux"; Col. 14, beginning of the Formula at line 35, "$N_2$" should be -- $H_2$ --; Col. 14, second line of the Formula, third grouping "CO" should read -- OC --; Col. 15, line 19, "93%" should read -- 92% --; Col. 15, line 39, "valve" should read -- value --; Col. 20, line 2, "wer" should read -- were --; Col. 23, line 73 "2,2- " should read -- 2,2'-

UNITED STATES PATENT OFFICE
CERTIFICATE OF CORRECTION

Patent No. 3,658,791          Dated — April 25, 1972

Inventor(s) Giuliana C. Tesoro, Wing-Kai Lee and Kelvin B. Domovs

It is certified that error appears in the above-identified patent and that said Letters Patent are hereby corrected as shown below:

Col. 25, line 70, "isotractic" should read -- isotactic --;
Col. 28, line 14, under the first part of the formula add
-- See Formula (3) --;  Col. 26, line 52, insert -- ( -- before
"Inc." ;  Col. 26, line 54, "carbon-bond" should read
-- carbon-bound --;  Col. 28, line 41, add -- % -- following
" 100 " ;  Col. 29, in the chart at the bottom of the column,
"Sample A under Wet pickup, percent" should read -- 63 -- instead
of "62" ;  Claim 2, line 5

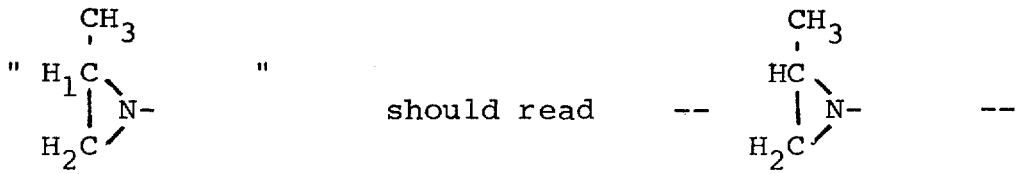

Claim 8, the first "CH" should read -- CH$_3$ -- .

Signed and sealed this 27th day of November 1973.

(SEAL)
Attest:

EDWARD M. FLETCHER, JR.            RENE D. TEGTMEYER
Attesting Officer                  Acting Commissioner of Patents